Nov. 4, 1952 G. M. MIERLEY 2,616,662
TURBINE BEARING SUPPORT STRUCTURE
Filed Jan. 5, 1949 3 Sheets-Sheet 1

INVENTOR
George M. Mierley
BY
ATTORNEY

Patented Nov. 4, 1952

2,616,662

UNITED STATES PATENT OFFICE 2,616,662

TURBINE BEARING SUPPORT STRUCTURE

George M. Mierley, Havertown, Pa., assignor to Westinghouse Electric Corporation, East Pittsburgh, Pa., a corporation of Pennsylvania Application January 5, 1949, Serial No. 69,385

3 Claims. (Cl. 253—39)

This invention relates to elastic fluid rotary apparatus, and more particularly to a turbine bearing and support structure.

It has been proposed to construct a gas turbine power plant suitable for aircraft propulsion, in which the spindle aggregate, comprising coupled compressor and turbine rotors, is supported on two bearings, consisting of a thrust bearing in advance of the compressor and a rear bearing mounted downstream of the turbine. Such a power plant is disclosed in the copending application, Serial No. 40,871 of Arnold H. Redding, filed July 27, 1948 and assigned to the assignee of the present invention and now abandoned. With this arrangement, the rear bearing and its supporting structure are disposed near the path of hot motive fluid exhausted from the turbine, and are thus subjected to extremely high temperatures. It is an object of this invention to provide an improved bearing and support structure for a gas turbine power plant of the character described.

Another object of the invention is the provision of an improved bearing and support apparatus for association with a rotor of a gas turbine engine including tangentially arranged struts constructed and arranged to insure accurate alignment of the bearing regardless of variations in engine temperature over a wide range.

A further object of the invention is the provision of an improved bearing support structure comprising annular carrier means mounted on the casing of the engine, and a plurality of strut members having their outer ends secured to the carrier means and their inner ends arranged in tangential supporting relation to the bearing housing.

It is also an object to provide a bearing support structure having the above characteristics and arranged to facilitate mounting of suitable conduits forming parts of a lubrication system or other fluid pressure system with which the engine is equipped.

These and other objects are effected by the invention as will be apparent from the following description and claims taken in connection with the accompanying drawings, forming a part of this application, in which:

Figure 1:
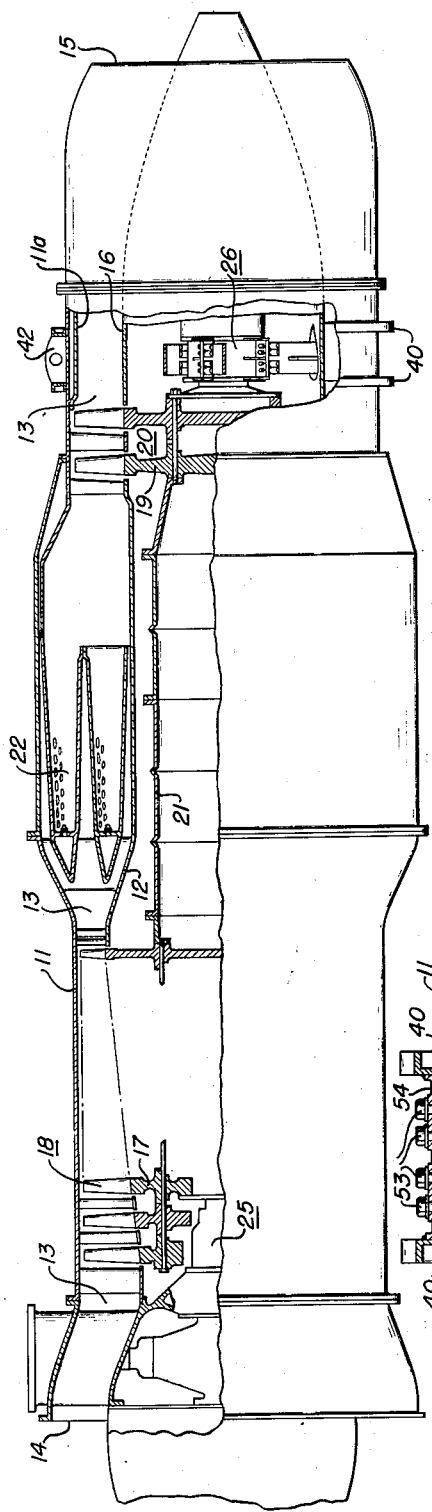
Fig. 1 is a diagrammatic elevational view, partly in section, of an aviation gas turbine power plant equipped with a bearing and support assembly constructed in accordance with the invention.

Referring to Fig. 1 of the drawings, the gas turbine power plant illustrated therein in diagrammatic form comprises a cylindrical outer casing structure 11 having mounted therein a sectional core structure 12, the outer and inner structures thus providing an annular passageway generally indicated by the reference character 13, which extends longitudinally through the power plant from a forwardly directed air inlet 14 to a rearwardly disposed discharge nozzle 15. The discharge nozzle 15 is annular in form, and is defined between a tapered casing section 11a and a hollow tail cone member 16, which is supported within the outer casing structure through the medium of substantially radially arranged hollow strut sections hereinafter described. Mounted in axial alignment within the casing structure 11 is a spindle aggregate comprising a compressor rotor 17 of an axial-flow compressor 18, and a rotor 19 of a turbine 20, the two rotors being coupled through the medium of a suitable hollow shaft 21. The shaft 21 extends through a space defined within an annular combustion apparatus 22, which is interposed in the passageway 13. The casing structure 11 is adapted to be mounted in a suitable manner on or in the fuselage or wing structure of an aircraft, with the air inlet 14 pointed in the direction of flight. It will be understood that the elements of the gas turbine, including the compressor 18, combustion apparatus 22 and turbine 20, are arranged in axial alignment within the cylindrical casing structure 11 for minimizing frontal area and drag incident to operation of the aircraft with which the apparatus is equipped.

The spindle aggregate, comprising the compressor rotor 17, hollow shaft 21 and turbine rotor 19, is entirely supported on a pair of bearing assemblies, comprising a thrust bearing assembly generally indicated at 25, and a rear bearing assembly indicated generally at 26. The thrust bearing assembly 25 may be supported through the medium of suitable radially arranged struts, not shown in detail, while the rear bearing assembly 26 is supported by the improved structure embodying the present invention. It will be noted that the rear bearing assembly 26 is mounted downstream of the turbine 20 and is thus subjected to heat from the turbine exhaust gases.

According to the well-known principle of operation of a gas turbine engine, air entering the air inlet 14 is compressed by the compressor 18 and delivered to the combustion apparatus 22, where fuel supplied by suitable means (not shown) is burned to provide hot motive fluid under pressure. The motive fluid is expanded through the turbine 20 for effecting operation of the compressor 18, and is finally discharged by way of the exhaust nozzle 15 in the form of a jet establishing a propulsion thrust.

Figure 2:
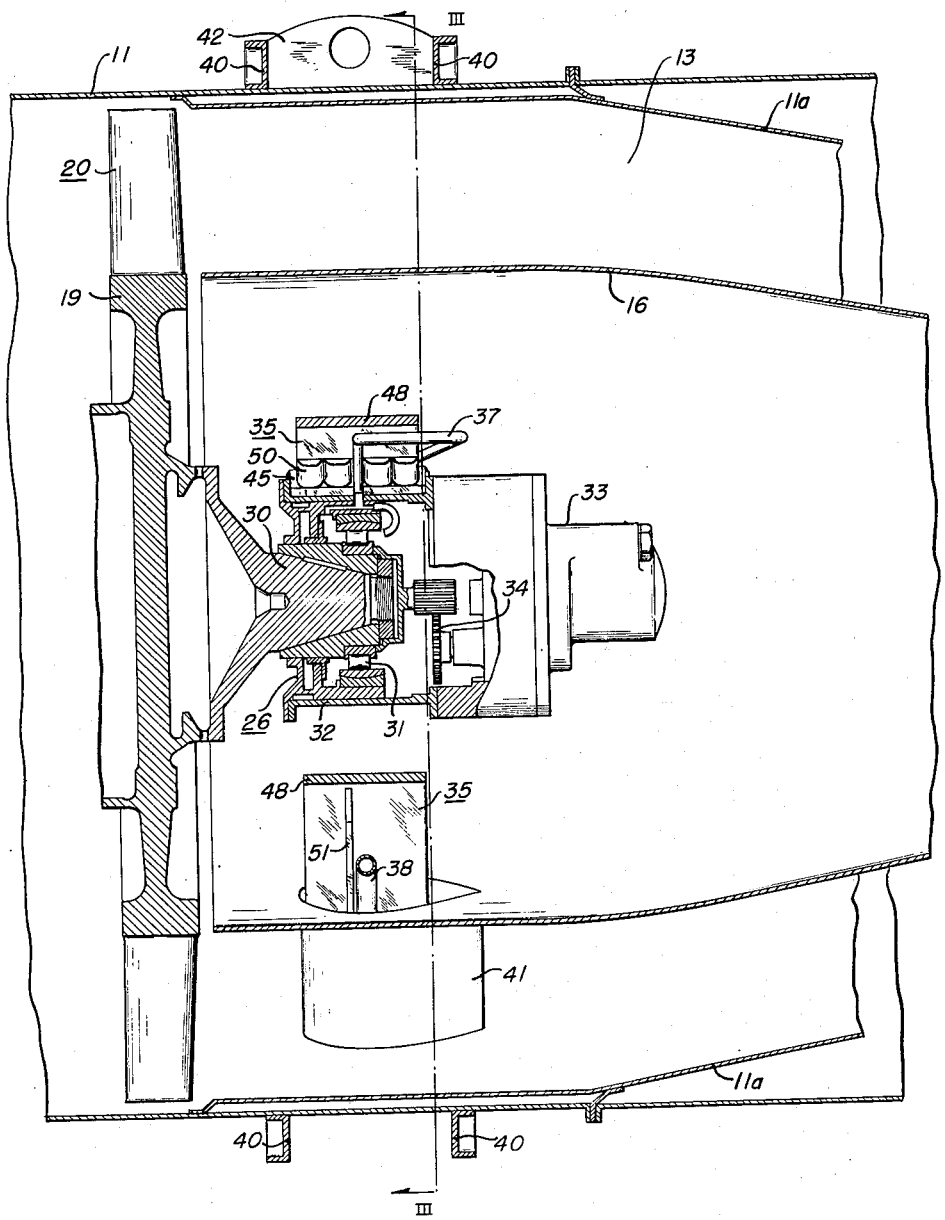
Fig. 2 is a fragmentary sectional view, in enlarged detail, of the bearing and support structure associated with the turbine of the apparatus shown in Fig. 1.

As best shown in Fig. 2 of the drawings, the bearing structure 26 comprises a bearing shaft portion 30 carried by the rotor 19 of the turbine 20, and a roller bearing assembly 31 suitably supported within an annular bearing housing 32, which is supported within the casing structure 11 through the medium of a plurality of outwardly extending strut members, one of which is indicated in Fig. 2 by the reference character 35. The bearing housing 32 may, if desired, be equipped with an extension 33 for containing a fluid pump, which may be operatively connected through the medium of suitable gearing 34 to the rotary bearing shaft member 30. The pump housed within the extension 33 may be associated with a fluid pressure system, such as a lubricating system, or a fluid pressure control system for operating an auxiliary device of the gas turbine engine. These fluid pressure systems do not form a part of the present invention, and details thereof are thus omitted from the drawings, with the exception of several of the fluid conduits, two of which are indicated by Fig. 2 by the reference characters 37 and 38.

According to the invention, the casing structure 11 is equipped with a carrier means comprising a pair of spaced annular channel members 40, which are welded or otherwise suitably secured to the casing structure outwardly of the rear bearing assembly 26, and substantially in alignment with the hollow strut members 41, which serve to support the tail cone member 16 from the casing section 11a. An apertured lifting eye member 42 is welded or otherwise secured to the channel members 40 on the uppermost side of the power plant, for facilitating handling of the engine during installation operations.

Figure 4:
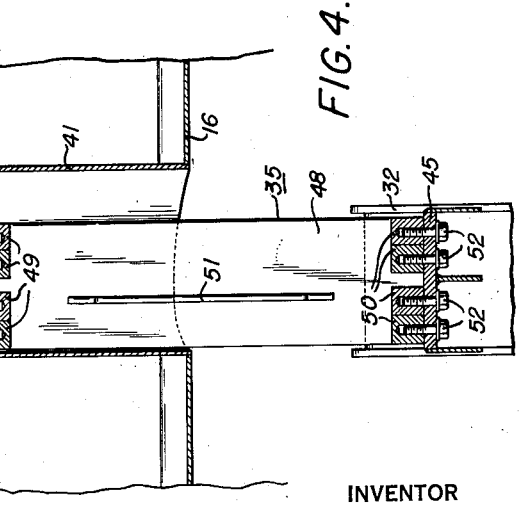
Fig. 4 is a fragmentary sectional view taken substantially along the line IV—IV of Fig. 3.
Figure 3:
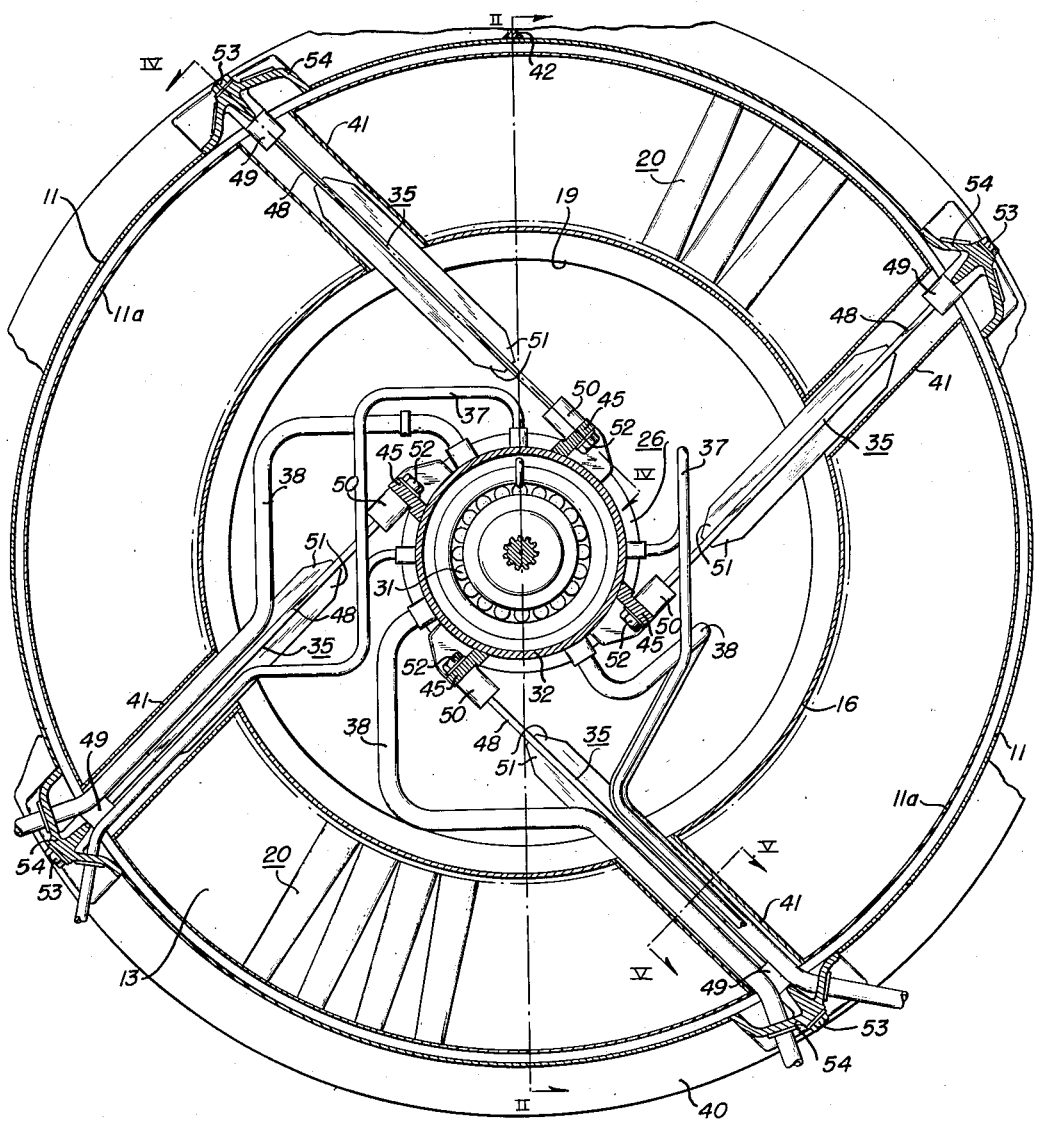
Fig. 3 is a sectional view taken substantially along the line III—III of Fig. 2.

As best shown in Fig. 3 of the drawings, the housing 32 of the bearing assembly 26 is equipped with a plurality, in the present embodiment four, outwardly projecting lugs 45, each of which is aligned with one of the hollow strut members 41. Secured to the lugs 45 are four outwardly extending strut members 35, which are arranged in tangential relation with respect to the bearing housing 32 in order to impart thereto a rotary force or torque, rather than a distorting force which might tend to shift the bearing out of axial alignment, upon expansion of the supporting structure when subjected to operational temperatures. As best shown in Fig. 4, each of the strut members 35 comprises an elongated plate or flat body portion 48, the outer end of which is welded or otherwise suitably secured to a number of bolting elements 49, and the inner end of which is similarly secured to an equal number of bolting elements 50. The central portion of the body 48 is preferably reinforced by webs 51 held normal thereto by welding. A plurality of bolts 52 are provided for securing the inner end of each strut member 35 to the associated lug 45 which extends from the bearing housing 32. The bolting elements 49 on the outer end of each strut member 35 are secured by means of suitable bolts 53 to one of four spanning or mounting members 54, which are interposed between and welded to the respective channel members 40 outwardly of the hollow strut members 41, as illustrated in Figs. 3 and 4.

Figure 5:
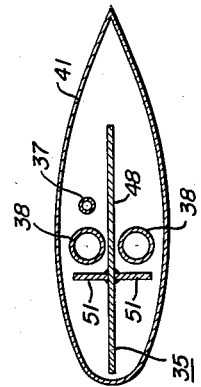
Fig. 5 is a sectional view taken along the line V—V of Fig. 3.

The several fluid conduits indicated by the reference characters 37 and 38, shown in Figs. 2 and 3, may readily be accommodated within the respective hollow strut members 41 at opposite sides of the associated strut members 35. A preferred arrangement of these conduits with relation to one of the hollow strut members 41 and the strut member 35 contained therein is illustrated in Fig. 5. As shown in Fig. 3, the conduits 37 and 38 may be provided with loop portions or bights, within the space enclosed by the tail cone member 16, for avoiding strain on the conduits in the event of relative rotation of the bearing housing 32, to which the inner ends of the conduits are attached. The mounting members may be provided with suitable openings for receiving the outer portions of the conduits.

From the foregoing, it will now be seen that the rear bearing of the gas turbine engine, disposed in the high temperature region adjacent the turbine, will be effectively supported from the annular channel members carried by the outer casing structure, in such a manner as to minimize the possibility of undesired distortion of the casing or misalignment of the bearing housing upon expansion or contraction of the struts due to variations in temperature. Since the plurality of equally spaced strut members are interposed between the channel members encompassing the engine casing, and the bearing housing, and are arranged in tangential relation to the latter, any change in length of the respective strut members will effect relative rotation of the bearing housing without tending to force it out of proper alignment. It will further be apparent that the improved bearing and supporting structure constructed in accordance with the invention utilizes a minimum number of lightweight but sturdy elements which are readily assembled to provide a structure having desirable stress resisting characteristics.

While the invention has been shown in but one form, it will be obvious to those skilled in the art that it is not so limited, but is susceptible of various changes and modifications without departing from the spirit thereof.

What is claimed is:

1. Turbine apparatus comprising cylindrical casing structure, annular wall structure spaced interiorly thereof to form a circular passageway, equally spaced tubular fairing sections interposed between said casing and wall structures for supporting the latter, bearing means mounted coaxially within said wall structure, a plurality of struts extending from said casing structure through the respective fairing sections into tangential supporting relation with said bearing means, said struts being spaced within and free from contact with said fairing sections, and a plurality of conduits for conducting fluid under pressure to and from said bearing means, said conduits extending through said fairing sections alongside said struts, respectively, the end of each of said conduits within said wall structure having a bight portion for yielding to slight turning of said bearing upon expansion of said struts.

2. In a gas turbine power plant, a casing structure providing a flow passage, a spindle aggregate therein including a turbine, bearing means therefor including a bearing housing axially disposed adjacent the exhaust side of said turbine, a generally cylindrical inner casing section carried by said casing structure and spaced inwardly thereof in encompassing relation with said flow passage outwardly of said bearing means, a hollow tail cone member disposed inwardly of said flow passage and coaxially enclosing said bearing means, said inner casing section and said tail cone member having apertures, a plurality of tubular fairing sections supporting said tail cone member from said inner casing section, each of said fairing sections extending between one of said apertures in the tail cone member and an aperture in said inner casing section to provide communication between the annular space enclosed by the latter and the interior of the tail cone member, and means for supporting said bearing housing from said casing structure comprising a pair of spaced annular channel members mounted on said casing structure, a plurality of circumferentially spaced bolting head members secured to said channel members, and a plurality of relatively flexible strut members having outer ends bolted to said bolting head members, respectively, and inner ends bolted to said bearing housing, said members converging into tangential supporting relation with said bearing housing, each of said strut members extending through one of said tubular fairing sections free from contact therewith, whereby expansion of said strut members will impart torque to said bearing housing without tendency toward misalignment thereof.

3. Turbine apparatus comprising cylindrical casing structure having a longitudinal gas flow passage, bearing means disposed concentrically therein, a plurality of elongated bearing supporting struts each of a uniform length at least exceeding the diameter of said bearing means, said struts being equally spaced circumferentially about said bearing means and diverging tangentially in the same angular direction with respect to the bearing axis, a pair of spaced annular channel members encompassing said casing structure means for rigidly securing the inner ends of said struts to said bearing means and the outer ends of said struts to said channel members and consequently to said casing structure, and shielding means for minimizing transfer to said bearing means and supporting struts of heat from the gases in said passage including a cylindrical inner casing section carried by said casing structure and spaced inwardly thereof, a hollow tail cone member encompassing said bearing means inwardly of said passage, and a plurality of tubular fairing sections supporting said tail cone member from said inner casing section, each of said fairing sections being disposed parallel to and enveloping one of said struts in spaced relation therewith, said elongated struts being uniformly yieldable without contact with said shielding means upon thermal expansion of said assemblage of elements for minimizing any tendency toward misalignment of said bearing means relative to said casing structure.

GEORGE M. MIERLEY.

REFERENCES CITED

The following references are of record in the file of this patent:

UNITED STATES PATENTS

| Number | Name | Date |
|---|---|---|
| 1,233,914 | Wiberg | Apr. 24, 1917 |
| 1,326,869 | Junggren | Dec. 30, 1919 |
| 2,410,450 | Kroon | Nov. 5, 1946 |
| 2,439,447 | Buck | Apr. 13, 1948 |

FOREIGN PATENTS

| Number | Country | Date |
|---|---|---|
| 882,330 | France | May 31, 1943 |